Jan. 11, 1966  A. B. STILES  3,228,893
MANGANO–CHROMIA–MANGANITE CATALYST COMPOSITION CONTAINING
ALKALI METAL AND ALKALINE EARTH METAL MANGANATES
Filed June 9, 1961
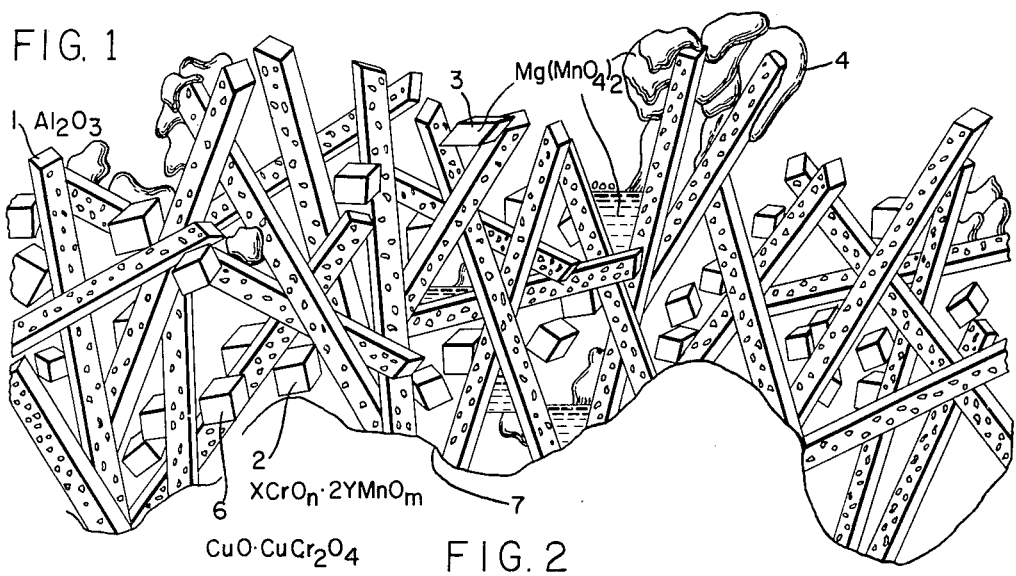
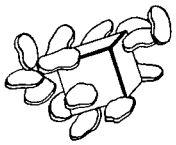
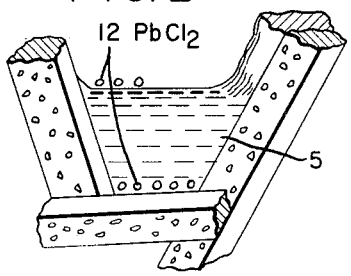
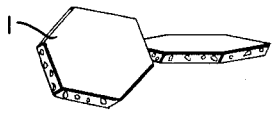
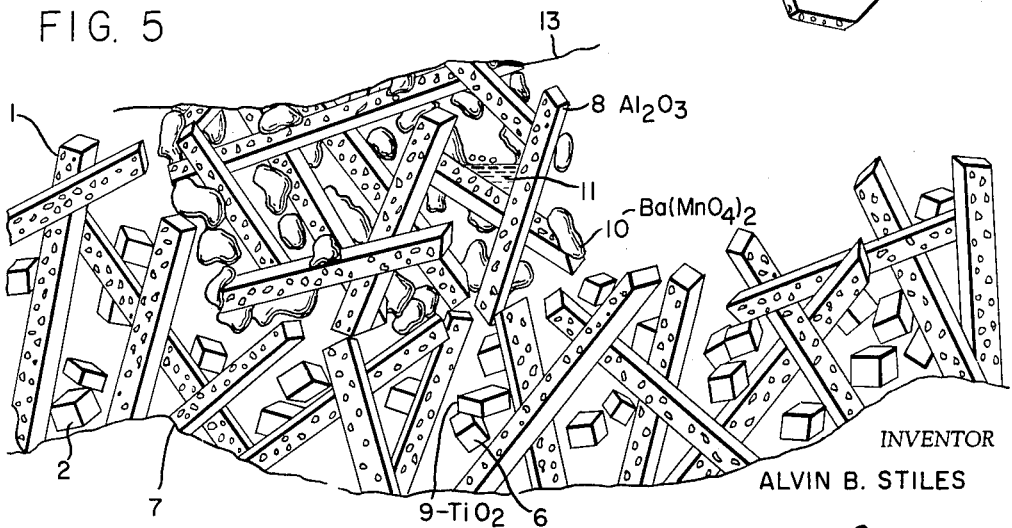
INVENTOR
ALVIN B. STILES
BY Albert B. Griggs
ATTORNEY 3,228,893
MANGANO-CHROMIA-MANGANITE CATALYST COMPOSITION CONTAINING ALKALI METAL AND ALKALINE EARTH METAL MANGANATES
Alvin B. Stiles, Charleston, W. Va., assignor to E. I. du Pont de Nemours and Company, Wilmington, Del., a corporation of Delaware
Filed June 9, 1961, Ser. No. 116,171
5 Claims. (Cl. 252—465)

This invention relates to the treatment of automobile exhaust gases which contain such products as nitrogen oxides, carbon monoxide, and hydrocarbons and which additionally contain the products of combustion of alkyl lead anti-knock compounds. The invention is more particularly directed to mangano-chromia-manganite catalysts the particles of which are contiguous to a manganate selected from the group consisting of alkali metal and alkaline earth metal manganates and permanganates and to the use of such products for the catalytic oxidation of the components of the combustion of leaded fuels in automobiles.

In the drawings:

FIGURE 1 is an artist's conception of the mode of continuous association of materials in the catalysts of the invention, FIGURE 2 is a more detailed illustration of the section in dotted lines in FIGURE 1, FIGURE 3 shows monoclinic crystals of alumina as pseudohexagonal crystals, FIGURE 4 shows the copper chromite crystallites in greater detail, and FIGURE 5 shows a modified embodiment in which manganates are present as discrete particles.

Mangano-chromia-manganites are described and claimed as catalysts for the treatment of automobile exhaust gases in the following patent applications; Howk & Stiles U.S. Ser. No. 109,483 filed May 19, 1961; Howk & Stiles U.S. Ser. No. 59,263 filed September 29, 1960.

The mangano-chromia-manganite catalysts as described are exceedingly effective for the treatment of automobile exhaust gases. They are characterized by low temperature light-off, long life, and comparatively low cost. The catalysts work best however with fuel which does not contain much lead and with leaded fuels give good results but the activity of the catalysts falls off during use.

According to the present invention the mangano-chromia-manganite catalysts of the above tabulated cases are protected from the products of combustion of leaded gasoline by the incorporation of a manganate.

Before proceeding to a detailed description of the invention, reference should be had to FIGURE 1 for a general description of the catalyst systems of the invention.

In FIGURE 1 there is shown at 1 the alumina of a typical refractory support. This is illustrated as monoclinic crystals of the hydrate. Electronmicrographs of alumina of the type here employed show that these can be more accurately represented as monoclinic crystals which are pseudohexagonal crystals as illustrated in FIGURE 3. It is noted that the holes showing at 1 in FIGURE 1 and at the edges of the hexagonal crystals in FIGURE 3 represent fissures from which water has evolved.

Mangano-chromia-manganite is illustrated at 2 as a cube. A typical manganate according to the invention, magnesium permanganate, is illustrated as an amorphous mass 4 and is also shown in molten form at 5. The magnesium permanganate is illustrated as a rhombohedral crystal at 3. A co-catalyst, copper chromite, is illustrated as a cube crystal at 6 and is perhaps more accurately represented in FIGURE 4 in which the CuO is shown as small appended crystallites upon a copper chromite cube.

As will be noted later, it is important that the manganate particles be associated with the catalyst particles in such a manner as to be contiguous but it is preferred that they not be intermixed as by coprecipitation though this can be done.

In the system as illustrated in FIGURES 1 and 2 there will be seen a pool of a magnesium permanganate shown at 5.

It is believed that the activity of catalysts of the invention in the presence of lead compounds arises from the fact that the magnesium permanganate becomes molten at temperatures encountered on the catalyst support surface and lead components illustrated at 12 by $PbCl_2$ gather upon the liquid and then gravitate downward as shown in FIGURE 2. They are thus sequestered with respect to the mangano-chromia-manganite. At the same time there may be some lead permanganate formed which may add activity.

It will be understood that while this explanation of function is believed to account for the data and the facts now available, it may be that some other explanation is equally consistent. It is possible, for example, that the lead compounds of whatever nature are reacted with the permanganate without substantial fusion.

*The mangano-chromia-manganite catalysts*

The mangano-chromia-manganite catalysts to be used according to the invention are described and claimed as such and with co-catalysts, interspersants, and supports in our co-pending applications above mentioned and reference can be had to such applications for further details. A general description will be sufficient here.

The mangano-chromia-manganites have the following empirical chemical composition:

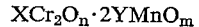

$$XCr_2O_n \cdot 2YMnO_m$$

in which $n$ can be 2, 3, and $m$ can be 1, 1.33, 1.5, 2, and 2.5. The Mn:Cr weight ratio can vary from 3:0.5 to 3:30. The atomic ratio, that of Y:X, is substantially the same and thus when Y equals 3, X can equal 0.5 to 30.

The mangano-chromia-manganite can be prepared having a ratio of Mn:Cr of 3:2 according to methods of Lazier U.S. Patents 1,746,782 and 1,964,001 and Wortz U.S. Patent 2,108,156. In these and other prior suggestions of manganese chromites it is proposed that equimolecular amounts of the manganese compound and the chromium compound be used which in aqueous solutions results in a product having a ratio of 3:2 because a third of the chromium is not precipitated and is washed away.

The mangano-chromia-manganites can be prepared by procedures which are described in detail in the Howk and Stiles applications mentioned above. Generally, it can be said that they are prepared by reacting appropriate salts of manganese and chromium in aqueous solution. Thus, manganese nitrate and chromic acid anhydride are dissolved in water and ammonia is added to make a precipitate. The products of high manganese ratio can be prepared by adjusting the amounts of components, but a high chromium product can be made when a hexavalent chromium salt is used as a chromium source only by adding further chromium compound, such as ammonium chromate, to the precipitate thus prepared after filtration. Alternatively, the appropriate proportion of suitable salts such as manganese nitrate with chromium nitrate can be precipitated or fused together to give mangano-chromia-manganites of the desired Mn:Cr ratio.

*Co-catalyst*

A co-catalyst can be included with the manganochromia-manganite and there can be used, for example, such co-catalysts as those described in Patent No. 1,964,001. Thus one of the following can be added as the carbonate or can be added as a basic chromate or oxide:

| | |
|---|---|
| copper | cadmium |
| nickel | cobalt |
| zinc | tin |
| iron | bismuth |

The co-catalysts can, of course, be added as other compounds depending upon the specific treatment and processing conditions used.

The weight ratio of co-catalyst:mangano-chromia-manganite can vary greatly and can range from, say 10:1 to 1:10. About 1:1 is preferred.

*Interspersants*

It is often desirable to add an interspersant to the catalyst aggregate as described in the above-mentioned Howk and Stiles applications. The interspersants are refractories which have a melting point about 1000° C. and more preferably above 1600° C. The crystallite size of the refractory should be such that its crystallites keep the crystallites of the mangano-chromia-manganite apart. The refractory crystallites serve a similar function with crystallites of co-catalysts which are present.

The interspersants which can be used include such water-insoluble precipitates as:

(1) aluminum oxide and hydroxide
(2) titania
(3) thoria
(4) ceria
(5) chromia
(6) magnesia
(7) calcium oxide and hydroxide
(8) barium oxide and hydroxide
(9) strontium oxide
(10) zinc oxide
(11) manganese oxide
(12) silica
(13) beryllia
(14) zirconia
(15) lanthana
(16) hafnia Aluminum hydroxide, which is present as oxide in the final product, is preferred. Manganese oxide and chromia are listed as interspersants to be added in amounts exceeding those which would be present in the mangano-chromia-manganite of the ratios described.

It is to be noted that the interspersants can be added in the first precipitate or formation of the catalyst aggregate and a second interspersant can be added after the catalyst aggregate has been formed and especially after it has been heat-treated or calcined. The interspersants can be heat-decomposable products or they can be introduced in the form of sols or dispersions.

The amount of the interspersants can be widely varied and the total of the first interspersants can run from, say, 5 to 75% based upon the weight of mangano-chromia-manganite plus a co-catalyst if there is one. A second interspersant can range in amount from 0.5 up to 50% or even more by weight of the weight of the catalyst aggregate to which it is added.

Further details of the introduction of co-catalysts and interspersants can be found in the Howk and Stiles applications previously mentioned.

According to the present invention the mangano-chromia-manganite catalyst is modified by associating with it particles of an alkali metal or alkaline earth metal manganate or permanganate in contiguous relation to the particles of catalyst. When reference is made herein to manganates this will ordinarily refer to both manganates and permanganates in accordance with customary terminology.

The alkali metal and alkaline earth metal manganates to use are the manganates and permanganates of sodium, potassium, lithium, calcium, barium, strontium, and magnesium.

The manganates and permanganates of the alkali metals are well defined compositions readily available in commerce. The manganates and permanganates of the alkaline earth metals are not commonly available and are quite expensive. Their structure is not too well understood and there is a tendency for the alkali and alkaline earth metal manganates and permanganates to convert from manganate to permanganate and vice versa during oxidation and reduction at high temperatures encountered in catalysts of the invention. It will ordinarily be most desirable as hereinafter illustrated to prepare the alkaline earth metal manganates in situ. Thus, in the case illustrated in the drawing sodium permanganate and magnesium nitrate are both dissolved in water and applied to a suitable support. This is then calcined to form the magnesium permanganate. After calcination the sodium nitrate is extractable with water but no substantial amount of a magnesium compound or of manganate is extractable.

Other examples of the formation of manganates in situ will be given in the examples. The manganates can be separately prepared and then applied to a carrier or catalyst according to the invention as will also be illustrated.

The amount of manganate to use can be widely varied because if too much is used it is merely wasteful and if too little is used the catalyst is still effective but does not obtain the full benefits of the invention. Generally it will be found satisfactory to use a proportion of the manganate to the mangano-chromia-manganite by weight of 10:1 to 0.1:1. The most preferred proportions are nearer the lower end of the range using amounts of manganate to catalyst in the vicinity of 1:1.

The mangano-chromia-manganite and the alkali metal and alkaline earth metal manganates can be mixed as powders and pilled, tableted or pelleted.

Precipitates of the mangano-chromia-manganite and of the alkali metal and alkaline earth metal manganates can be separately prepared and then brought together and spray dried simultaneously.

A contiguous relation between the particles of catalyst and manganate can best be obtained and a catalyst of high effectiveness and relatively low cost can be made by applying the catalyst and manganate to a refractory support. First one and then the other can be applied to the support. The mangano-chromia-manganite catalyst can also be formed in situ on the support as will be illustrated hereinafter.

As will be illustrated in the examples the manganate can be coprecipitated with the catalyst. This is a less preferred embodiment of the invention. It is to be noted that in catalysts of the invention which contain a mangano-chromia-manganite and a manganate there will be more or less interaction between the manganese and the manganate.

As shown in FIGURE 5 the manganate can be applied, or mixed, with the mangano-chromia-manganite catalyst as discrete particles or aggregates of a number of manganate crystallites. Thus a finely ground manganate can be applied to the catalyst. As shown in FIGURE 5 a supported mangano-chromia-manganite catalyst is indicated as in FIGURE 1 with the same numbers representing the same things as that in FIGURE 5. A discrete manganate particle is shown in contact with the catalyst. This is made up of manganate particles 10 and 11 combined with alumina 8.

Alternatively there can be used any of a wide variety of materials which are inert and relatively infusible by mixing these with the manganate. Particles thus can be made which are somewhat less fusible than the manganate particles themselves. Finely divided silica, silica aerogels, and clays such as bentonite can be used in addition to other finely divided supports named below.

The discrete particles of manganate whether as an aggregate or as groups of crystallites can range in size down to the size of a single crystallite or two up to such a size that the particles will not form a stable bond between the catalyst proper and the discrete particle after the moderate calcination to which the catalyst is normally subjected. This size varies somewhat with the melting point of the manganate, the calcination temperature and other variables but generally the particles should be less than 25 microns in greatest dimension. In preparing discrete particles of manganates with suitable supports and inerts the amount of the manganate can range from 5 up to 100% though for practical reasons it will ordinarily be preferred if using a support to use about 25 to 75% of a manganate by weight based upon the total weight of the particles.

*Supports*

Supports suitable for use according to the present invention include various refractory bodies customarily used for this purpose in the art. There can be used for example:

(1) porous ceramic spheres, tablets, or rings which have a softening or melting point in excess of 1200° C.
(2) etched nickel, nichrome, and inconel wire
(3) alundum
(4) pumice
(5) diaspore
(6) bauxite
(7) periclase
(8) zirconia
(9) titania
(10) diatomaceous earth
(11) calcium sulfate
(12) barium oxide
(13) calcium oxide
(14) activated alumina granules.

The preferred refractory supports are:

bauxite      titania
zirconia     activated alumina

It is preferred that the surface area be at least 10 M²/g. with pore dimensions such that 40% are less than 200 angstroms. It is even more preferred that the surface area be at least 80 M²/g. with pore dimensions of at least 60% less than 200 angstroms. Mangano-chromia-manganite catalysts employing such preferred supports are described and claimed in U.S. application Serial No. 109,483, filed May 19, 1961. The catalyst support can be washed with water or with weak acids followed by washing with water as covered in a copending application of the assignee of the present case, Gilby, U.S. application Serial No. 108,763 filed May 9, 1961.

The amount of catalyst applied to a support can be widely varied in accordance with usual practices but ordinarily will run from 1 to about 20% by weight based upon the weight of refractory. Less catalyst does not ordinarily give adequate activity and more catalyst is wasteful.

The catalyst containing the alkali metal manganate or permanganate whether tabletted or supported as described can be calcined, if desired, at a temperature which does not go so high as to result in sintering of the catalyst components including the chromate. Temperatures from about 250 to 800° C. will be satisfactory and the times can run from a few minutes up to 30 minutes or an hour. Such calcination will be particularly desirable if there are heat-decomposable components in the catalyst.

In order that the invention may be better understood reference should be had to the following illustrative examples.

*Example 1*

(1) 250 parts by weight of activated alumina, 4–8 mesh having 200 square meters per gram surface area and 60% of the pores less than 600 A. in diameter are immersed in a solution of 31 parts by weight of $KMnO_4$ in 500 parts by weight of distilled water at 70° C. for 15 minutes.

(2) The granules are removed, then are dried at 150° C. for 16 hours.

(3) They are then immersed in a solution of 2 parts by weight of magnesium as the nitrate for 15 minutes at 50° C.

(4) The granules are then drained and calcined at 300° C. for one hour.

(5) The granules are then immersed in a solution of 5.5 parts by weight of manganese, 2.6 parts by weight of $Al_2O_3$, 6.3 parts by weight of copper all as nitrates plus 37 parts by weight of $CrO_3$ in 500 parts by weight of distilled water at 70° C. for 15 minutes.

(6) The granules are then exposed to anhydrous ammonia vapor to form $Al(OH)_3$ and complex metallochromates, chromites, or manganites.

(7) The granules are then calcined at 500° C. for one hour.

A catalyst as thus prepared is illustrated in FIGURE 1 of the drawings. The activated alumina serves as the support 1. Upon the support there is distributed the mangano-chromia-manganite catalyst shown as cubes in the drawing at 2. This is formed in situ by reaction of chromium and manganese nitrates in situ upon calcination. The alumina which forms from the addition of aluminum nitrate in Step 5 serves as an interspersant for the mangano-chromia-manganite and since it is indistinguishable in craystalline from the support it is also represented by the alumina shown at 1 in the drawing. The copper chromite co-catalyst is shown in the drawing at 6 as cubic in form and in FIGURE 4. The magnesuim permanganate employed according to the invention is illustrated in the drawing as a rhombohedral crystal 3 but it more often exists in amorphous form as shown at a number of places in the drawing at 4. In operation of the catalyst it is believed that the magnesuim permanganate becomes liquid at especially hot areas as shown at 5 in FIGURE 2.

The catalyst as prepared is effective for treatment of automobile exhaust resulting from burning leaded fuels. These exhaust gases normally contain nitrogen oxides, carbon monoxide, unburned hydrocarbons, and products of combustion of alkyl lead anti-knock agents. Ordinarily there are also halides present with the anti-knock agents. The lead compounds are illustrated in the drawing by $PbCl_2$ but actually include a wide variety of species including such compounds as lead bromides, lead oxyhalides, and various other complex lead compounds. The catalyst effectively converts the carbon monoxide to carbon dioxide and converts the hydrocarbons to carbon dioxide water vapor. The nitrogen oxides are in part reduced to nitrogen. The lead compounds are in part removed but part pass through the catalyst unchanged.

*Example 2*

(1) 250 parts by weight of activated alumina 4–8 mesh size of the type used in Example 1 are immersed in a solution of 31 parts by weight of $KMnO_4$ in 500 parts by weight of distilled water at 70° C. for 15 minutes.

(2) The granules are removed, then are dried at 150° C. for 16 hours.

(3) The granules are next immersed in a solution containing 2 parts by weight of magnesium as the nitrate in 500 parts by weight of water for 15 minutes at 50° C.

(4) The granules are then drained and calcined at 300° C. for one hour.

(5) The calcined granules are washed with distilled water to remove soluble alkaline salts.

(6) After drying, the granules are immersed in a solution of 5.5 parts by weight of manganese, 2.6 parts by weight of $Al_2O_3$, 5.9 parts by weight of nickel all as the nitrates, plus 37 days by weight of $CrO_3$ and 500 parts by weight distilled water at 70° C. for 15 minutes.

(7) The granules are placed in a vessel permitting ammonia vapor to be pased over them to form $Al(OH)_3$ and complex metallo chromates-chromites-manganites.

(8) The granules are next calcined at 500° C. for one hour. The catalyst as thus prepared is useful for the abatement of fumes from automotive engines fueled with leaded gasoline.

*Examples 3 through 9*

Instead of 5.9 parts by weight of nickel used in Step 6 of Example 2, use the following weights of the below tabulated metals to produce an automobile exhaust catalyst as shown in Example 2.

*Example 3.*—6.5 parts by weight of zinc.
*Example 4.*—5.6 parts by weight of iron.
*Example 5.*—11.9 parts by weight of tin.
*Example 6.*—5.9 parts by weight of cobalt.
*Example 7.*—11.3 parts by weight of cadmium.
*Example 8.*—20.9 parts by weight of bismuth.
*Example 9.*—3.1 parts by weight of copper substituted for one-half of the nickel specified in Example 2.

*Example 10*

(1) 250 parts by weight of silica gel, 4-8 mesh, having 330 square meters per gram surface area and having 50% of the pores less than 100 A in diameter are immersed in a solution of 125 parts by weight of $KMnO_4$ and 500 parts by weight of water at 70° C. for 15 minutes.

(2) After draining, the granules are dried for 16 hours at 150° C.

(3) After drying, the granules are immersed in a solution of 16.5 parts by weight of manganese, 2.6 parts by weight of $Al_2O_3$, 6.3 parts by weight of copper and 7.8 parts by weight of chromium all as nitrates and 500 parts by weight of water at 70° C. for 15 minutes.

(4) The granules after draining are calcined at 500° C. for one hour.

The catalyst so prepared is useful as an automotive exhaust catalyst for engines fueled with leaded gasoline.

*Example 11*

(1) 250 parts by weight of silica-alumina granules, 4-8 mesh, and having a surface area of 40 square meters per gram and 50% of the pores smaller than 400 A in diameter are immersed in a solution of 5 parts by weight $KMnO_4$ and 500 parts by weight of water at 50° C. for 15 minutes.

(2) The granules are drained and then dried at 150° C. for 16 hours.

(3) The granules are then immersed in a solution of 2 parts by weight of barium as the nitrate in 500 parts by weight of water at 50° C. for 15 minutes.

(4) The granules are drained, then calcined at 300° C. for one hour.

(5) The granules, after calcining, are then washed with distilled water to remove soluble alkali.

(6) After drying, the granules are again immersed in a solution-slurry of 2.75 parts by weight manganesse, 3.1 parts by weight of copper, 3.0 parts by weight of nickel, 31.2 parts by weight of chromium all as nitrates plus 5.0 parts by weight of $TiO_2$ as a colloidal dispersion all in 500 parts by weight of water at 70° C. for 15 minutes.

(7) The granules are drained, then are calcined at 400° C. for one hour.

The catalyst thus prepared is useful for the abatement of noxious constituents in automotive exhausts when the engines are fueled with leaded gasoline.

*Examples 12 through 20*

Instead of 5.0 parts by weight of $TiO_2$ used in Step 6 of Example 11, use the following weights of the below tabulated interspersants to produce an automobile exhaust catalyst as shown in Example 11.

*Example 12.*—5.0 parts by weight of $SiO_2$ as a colloidal dispersion.
*Example 13.*—5.0 parts by weight of $Ce_2O_3$ as the nitrate.
*Example 14.*—5.0 parts by weight of BeO as the nitrate.
*Example 15.*—5 parts by weight of $HfO_2$ as the nitrate.
*Example 16.*—5 parts by weight of magnesium oxide as the nitrate.
*Example 17.*—5 parts by weight of $La_2O_3$.
*Example 18.*—5 parts by weight of ZnO as the nitrate.
*Example 19.*—5 parts by weight of $ThO_2$ as the nitrate.
*Example 20.*—5 parts by weight of $ZrO_2$ as the nitrate.

*Example 21*

(1) 250 parts by weight of activated alumina of the type used in Example 1, as 4-8 mesh granules, is immersed in a solution of 24 parts by weight of $NaMnO_4$ in 500 parts by weight of water at 80° C. for 15 minutes.

(2) The granules are drained, then dried at 150° C. for 16 hours.

(3) The dried granules are immersed in a solution of 16.5 parts by weight of manganese, 6.3 parts by weight of copper as the nitrate, 30 parts by weight of $CrO_3$ plus 5 parts by weight of $SiO_2$ as a colloidal dispersion in 500 parts by weight of water at 75° C.

(4) The granules are drained, then ammonia is passed over and through them to cause precipitation.

(5) The granules are then calcined at 500° C. for one hour. The catalyst thus prepared is useful as an agent for abating the fumes in automotive exhausts when the engines are fueled with leaded gasoline.

*Examples 22 through 30*

Instead of 24 parts by weight of $NaMnO_4$ used in Step 1 of Example 21, use the following weights of the below tabulated manganates and permanganates to produce an automobile exhaust catalyst as shown in Example 21.

*Example 22.*—28 parts by weight of $Na_2MnO_4$.
*Example 23.*—26 parts by weight of $KMnO_4$.
*Example 24.*—33 parts by weight of $K_2MnO_4$.
*Example 25.*—21 parts by weight of $LiMnO_4$.
*Example 26.*—24 parts by weight of $Ca(MnO_4)_2$.
*Example 27.*—31 parts by weight of $Ba(MnO_4)_2$.
*Example 28.*—21 parts by weight of $BaMnO_4$.
*Example 29.*—22 parts by weight of $Mg(MnO_4)_2$.
*Example 30.*—32 parts by weight of $Sr(MnO_4)_2$.

*Example 31*

(1) 250 parts by weight of activated alumina, 4-8 mesh of the type used in Example 1, is immersed in a solution of 16.5 parts by weight of manganese, 3.0 parts by weight of cobalt, 3.2 parts by weight of zinc, 2.0 parts by weight of $Al_2O_3$ all as the nitrates plus 30 parts by weight of $CrO_3$ in 500 parts by weight of water at 65° C. for 15 minutes.

(2) The granules are drained, then calcined at 400° C. for two hours.

(3) They are next placed in a heated rotating drum and a solution containing 2 parts by weight of $ThO_2$ as nitrate and 10 parts by weight of $KMnO_4$ and 50 parts by weight of water are sprayed onto the granules in such a way that the water is evaporated and the salts are retained uniformly on the granules.

(4) The granules are next calcined at 200° C. for two hours. The catalyst thus prepared is useful for the abatement of fumes of automobiles when the engines are burning leaded gasoline.

*Example 32*

(1) 50 parts by weight of Nichrome wire 0.01 inch in diameter by one inch long is etched by immersion in a molten mixture of 200 parts by weight of KOH and 400 parts by weight of KNO₃ for one hour at 525° C. The Nichrome to be used in this example contains 80% nickel and 20% chromium.

(2) The etched wire is washed, then immersed in a molten mixture of 300 parts by weight of calcium permanganate and 10 parts by weight of $Al_2O_3$ as the nitrate at 150° C. for 15 minutes.

(3) The coated wire is next calcined at 300° C. for one hour.

(4) The ignited and coated wire is immersed in a molten mixture of 165 parts by weight of manganese, 32 parts by weight of copper, 30 parts by weight of nickel, 156 parts by weight of chromium and 32 parts by weight of $Ce_2O_3$ all as nitrates for 15 minutes at 150° C.

(5) The etched wire is allowed to drain free of excess salts, then is calcined at 400° C. for one hour. The catalyst thus prepared is useful for the abatement of fumes from automobiles fueled with leaded gasoline.

*Examples 33 through 40*

Instead of 32 parts by weight of $Ce_2O_3$ specified in Step 4 of Example 32, use the following weights of the interspersants tabulated below to produce an automobile exhaust catalyst as shown in Example 32.

*Example 33.*—2.5 parts by weight of BeO as the nitrate.

*Example 34.*—15.0 parts by weight of $Cr_2O_3$ as chromium hydroxide.

*Example 35.*—21.0 parts by weight of $HfO_2$ as the nitrate.

*Example 36.*—32.0 parts by weight of $La_2O_3$ as the nitrate.

*Example 37.*—13.3 parts by weight of $ZrO_2$ as the nitrate.

*Example 38.*—26.4 parts by weight of $ThO_2$ as the nitrate.

*Example 39.*—15.0 parts by weight of $TiO_2$ as a colloidal dispersion.

*Example 40.*—15.0 parts by weight of $SiO_2$ as a colloidal dispersion.

*Example 41*

A catalyst in which the permanganate is present as discrete particles can be prepared as follows:

*Supported catalyst preparation*

(1) 250 parts by weight of 4–8 mesh activated alumina is immersed in a solution-slurry of 16.5 parts by weight of manganese, 6.3 parts by weight of copper, both as the nitrates, plus 30 parts by weight of $CrO_3$ and 4 parts by weight of titanium dioxide as a colloidal aqueous dispersion, all in 500 parts by weight of water at 90° C.

(2) The granules after mild agitation in the liquid for 15 minutes are allowed to drain then are exposed to a flow of anhydrous ammonia vapor, then finally calcined at 400°. C.

*Preparation of discrete permanganate particles*

(3) 500 parts by weight of alumina hydrate of particle size such that 100% is in the range 5 to 25 microns (as determined by eleutriation) is placed in a heated and rotated vessel.

(4) A slurry-solution containing 100 parts by weight of barium permanganate is sprayed onto the alumina hydrate and dried.

(5) 250 parts by weight of supported catalyst is mixed with 50 parts by weight of the discrete permanganate particles. These are tumbled together in a heated atmosphere at 300° C. for about 30 minutes.

The products as thus prepared are suitable for use as a catalyst for treatment of leaded automobile exhaust gases.

Instead of using alumina hydrate as shown there can instead be used fibrous alumina monohydrate having the boehmite crystal lattice, pumice, diatomaceous earth, finely divided silica or silica aerogels, or other of the supports listed above in like amounts by weight with the permanganate shown above or with other of the permanganates or manganates shown in this application to form discrete particles having a size not greater than 25 microns.

The catalyst as prepared in the example above using alumina as a support for both the mangano-chromia-manganite and the permanganate is shown in FIGURE 5 in the drawing. The surface of the support is shown at 7 and like materials in FIGURES 1 and 2 are designated by like numerals in FIGURE 5. In the catalyst of FIGURE 5 titanium dioxide is shown at 9 as an interspersant being in the form of tetragonal crystals.

In FIGURE 5, 10 and 11 refer to barium permanganate. A portion of one discrete particle is shown which is broke at 13 and the remainder of the particle is illustrated as being in contact with the catalyst surface. The portion of the particle shown represents aluminum hydrate at 8 and is illustrated further in FIGURE 3. As illustrated in the drawing there is some sintering and attachment between the discrete particle and the outer surface of the catalyst.

What is claimed is:

1. As a catalyst for the treatment of combustion gases which contain such products as nitrogen oxides, carbon monoxide, and hydrocarbons and which additionally contain a lead compound; mangano-chromia-manganite catalyst having the empirical formula:

$$XCr_2O_n \cdot 2YMnO_m$$

where the ratio of $Y:X=3:0.5$ to $3:30$, $n=2, 3$, and 6 and $m=1$, 1.33, 1.5, 2, and 2.5, together with a manganate selected from the group consisting of alkali metal, and alkaline earth metal manganates and permanganates, the proportion of the manganate to the mangano-chromia-manganite by weight being 10:1 to 0.1:1.

2. As a catalyst for the treatment of combustion gases which contain such products as nitrogen oxides, carbon monoxide, and hydrocarbons and which additionally contain a lead compound; mangano-chromia-manganite catalyst having the empirical formula:

$$XCr_2O_n \cdot 2YMnO_m$$

where the ratio of $Y:X=3:0.5$ to $3:30$, $n=2, 3$, and 6 and $m=1$, 1.33, 1.5, 2, and 2.5, supported upon a refractory upon which there is also supported a manganate selected from the group consisting of alkali metal and alkaline earth metal manganates and permanganates, the proportion of the manganate to the mangano-chromia-manganite by weight being 10:1 to 0.1:1 and the amount of mangano-chromia-manganite being 1 to 20% by weight of the refractory.

3. As a catalyst for the treatment of combustion gases which contain such products as nitrogen oxides, carbon monoxide, and hydrocarbons and which additionally contain a lead compound; mangano-chromia-manganite catalyst having the empirical formula:

$$XCr_2O_n \cdot 2YMnO_m$$

where the ratio of $Y:X=3:0.5$ to $3:30$, $n=2, 3$, and 6 and $m=1$, 1.33, 1.5, 2, and 2.5, supported upon a refractory selected from the group consisting of bauxite and alumina, the surface area of which is at least 10 M²/g. and the pore dimensions are such that 40% are less than 200 Angstroms and upon which there is also supported a manganate selected from the group consisting of alkali metal and alkaline earth metal manganates and permanganates, the proportion of the manganate to the mangano-chromia-manganite by weight being 10:1 to 0.1:1 and the amount of mangano-chromia-manganite being 1 to 20% by weight of the refractory.

4. As a catalyst for the treatment of combustion gases which contain such products as nitrogen oxides, carbon monoxide, and hydrocarbons and which additionally contain a lead compound; mangano-chromia-manganite catalyst having the empirical formula:

$$XCr_2O_n \cdot 2YMnO_m$$

where the ratio of $Y:X=3:0.5$ to $3:30$, $n=2, 3,$ and $6$ and $m=1, 1.33, 1.5, 2,$ and $2.5$, a co-catalyst selected from the group consisting of chromites of copper, nickel, iron, zinc, cadmium, cobalt, tin, and bismuth, the mangano-chromia-manganite catalyst and co-catalyst being used together with a manganate selected from the group consisting of alkali metal and alkaline earth metal manganates and permanganates, the proportion of the manganate to the mangano-chromia-manganite by weight being 10:1 to 0.1:1 and the weight ratio of the said chromites to the mangano-chromia-manganite is from 10:1 to 1:10.

5. As a catalyst for the treatment of combustion gases which contain such products as nitrogen oxides, carbon monoxide, and hydrocarbons and which additionally contain a lead compound; mangano-chromia-manganite catalyst having the empirical formula:

$$XCr_2O_n \cdot 2YMnO_m$$

where the ratio of $Y:X=3:0.5$ to $3:30$, $n=2, 3,$ and $6$ and $m=1, 1.33, 1.5, 2,$ and $2.5$, containing an interspersant of similar crystallite size and selected from the group consisting of oxides of aluminum, titanium, chromium, magnesium, barium, calcium, and strontium, the catalysts and interspersant being used together with a manganate selected from the group consisting of alkali metal and alkaline earth metal manganates and permanganates, the proportion of the manganate to the mangano-chromia-manganite by weight being 10:1 to 0.1:1 there being 5 to 75% of said oxides based on the weight of mangano-chromia-manganite.

References Cited by the Examiner
UNITED STATES PATENTS

| | | | |
|---|---|---|---|
| 1,934,795 | 11/1933 | Frazer | 23—2.2 |
| 1,939,708 | 12/1933 | Larson | 252—471 |
| 1,995,274 | 3/1935 | Eversole | 252—465 X |
| 2,025,140 | 12/1935 | Wenzel | 252—471 X |
| 2,031,475 | 2/1936 | Frazer | 23—2.2 |
| 2,071,119 | 2/1937 | Harger | 23—2.2 |
| 2,588,260 | 3/1952 | Lynch et al. | 252—471 |
| 2,942,933 | 6/1960 | Batchelder et al. | 23—2.2 |
| 3,067,002 | 13/1962 | Reid | 23—2 |

MAURICE A. BRINDISI, *Primary Examiner.*

JULIUS GREENWALD, *Examiner.*